United States Patent
Tsai

(10) Patent No.: US 10,469,726 B1
(45) Date of Patent: Nov. 5, 2019

(54) REVERSING DISPLAY SYSTEM WITH WIRELESS SWITCHING MULTI-VIEW IMAGES AND METHOD THEREOF

(71) Applicant: INVENTEC BESTA CO., LTD., Taipei (TW)

(72) Inventor: Chun-Yen Tsai, Taipei (TW)

(73) Assignee: INVENTEC BESTA CO., LTD., Taipei (TW)

( * ) Notice: Subject to any disclaimer, the term of this patent is extended or adjusted under 35 U.S.C. 154(b) by 0 days.

(21) Appl. No.: 16/136,224

(22) Filed: Sep. 19, 2018

(51) Int. Cl.
*H04N 5/232* (2006.01)
*H04N 5/262* (2006.01)
*B60R 1/00* (2006.01)

(52) U.S. Cl.
CPC ........... *H04N 5/23203* (2013.01); *B60R 1/00* (2013.01); *H04N 5/23293* (2013.01); *H04N 5/23296* (2013.01); *H04N 5/2628* (2013.01); *B60R 2300/20* (2013.01); *B60R 2300/306* (2013.01); *B60R 2300/8066* (2013.01)

(58) Field of Classification Search
CPC ........... H04N 5/23203; H04N 5/23293; H04N 5/23296; H04N 5/2628; B60R 1/00; B60R 2300/20; B60R 2300/306; B60R 2300/8066
See application file for complete search history.

(56) References Cited

U.S. PATENT DOCUMENTS

| | | | | |
|---|---|---|---|---|
| 6,144,296 A * | 11/2000 | Ishida | ..................... | B60K 35/00 340/461 |
| 6,515,581 B1 * | 2/2003 | Ho | ............................ | B60R 1/00 340/425.5 |
| 6,850,689 B1 * | 2/2005 | Ozawa | ..................... | G09G 5/00 348/E5.062 |
| 7,195,267 B1 * | 3/2007 | Thompson | ............... | B60D 1/36 280/477 |
| 7,500,794 B1 * | 3/2009 | Clark | ..................... | G03B 17/00 348/143 |
| 8,659,619 B2 * | 2/2014 | Cannon | ................... | G06T 11/60 345/619 |
| 9,840,198 B2 * | 12/2017 | Zhu | .......................... | B60R 1/00 |
| 9,975,427 B2 * | 5/2018 | Hisatsugu | .............. | B60K 35/00 |
| 2003/0137586 A1 * | 7/2003 | Lewellen | ............... | H04N 7/181 348/148 |
| 2003/0160868 A1 * | 8/2003 | Kakou | ............. | G08B 13/19602 348/143 |
| 2003/0227548 A1 * | 12/2003 | Kawakami | ............. | H04N 7/183 348/152 |

(Continued)

*Primary Examiner* — Peter D Le
(74) *Attorney, Agent, or Firm* — Chih Feng Yeh; Huntington IP Consulting Co., Ltd.

(57) ABSTRACT

A reversing display system with wireless switching multi-view images and a method thereof are disclosed. A remote controller is used to select an image area of a reversing image. A reversing display camera receives image area information and a partial enlargement instruction from the remote controller through a wireless receiver connected to the remote controller, enlarges the selected image area according to the partial enlargement instruction to produce a partial enlarged image, and transmits the partial enlarged image to an onboard display device for display. The system and method allow manipulation of reversing images through remote controller and can provide partial enlarged images to be displayed by the onboard display device.

10 Claims, 10 Drawing Sheets

(56) References Cited

U.S. PATENT DOCUMENTS

| | | | |
|---|---|---|---|
| 2006/0073796 A1* | 4/2006 | Collavo | H04M 1/6091 455/116 |
| 2006/0133787 A1* | 6/2006 | Ike | H04N 7/18 396/56 |
| 2006/0269264 A1* | 11/2006 | Stafford | G03B 15/00 396/56 |
| 2009/0102933 A1* | 4/2009 | Harris | G06F 3/0481 348/211.4 |
| 2010/0123828 A1* | 5/2010 | Park | H04N 5/145 348/571 |
| 2010/0244708 A1* | 9/2010 | Cheung | H05B 37/0218 315/158 |
| 2012/0062743 A1* | 3/2012 | Lynam | B60Q 9/005 348/148 |
| 2013/0038731 A1* | 2/2013 | Brey | B60R 11/04 348/148 |
| 2015/0156443 A1* | 6/2015 | Taniuchi | H04N 5/44513 348/561 |
| 2015/0208115 A1* | 7/2015 | Kutsumi | H04N 21/4432 725/32 |
| 2017/0015246 A1* | 1/2017 | Honghalli Devaraju | G06F 9/4401 |
| 2018/0074490 A1* | 3/2018 | Park | G07C 5/008 |

* cited by examiner

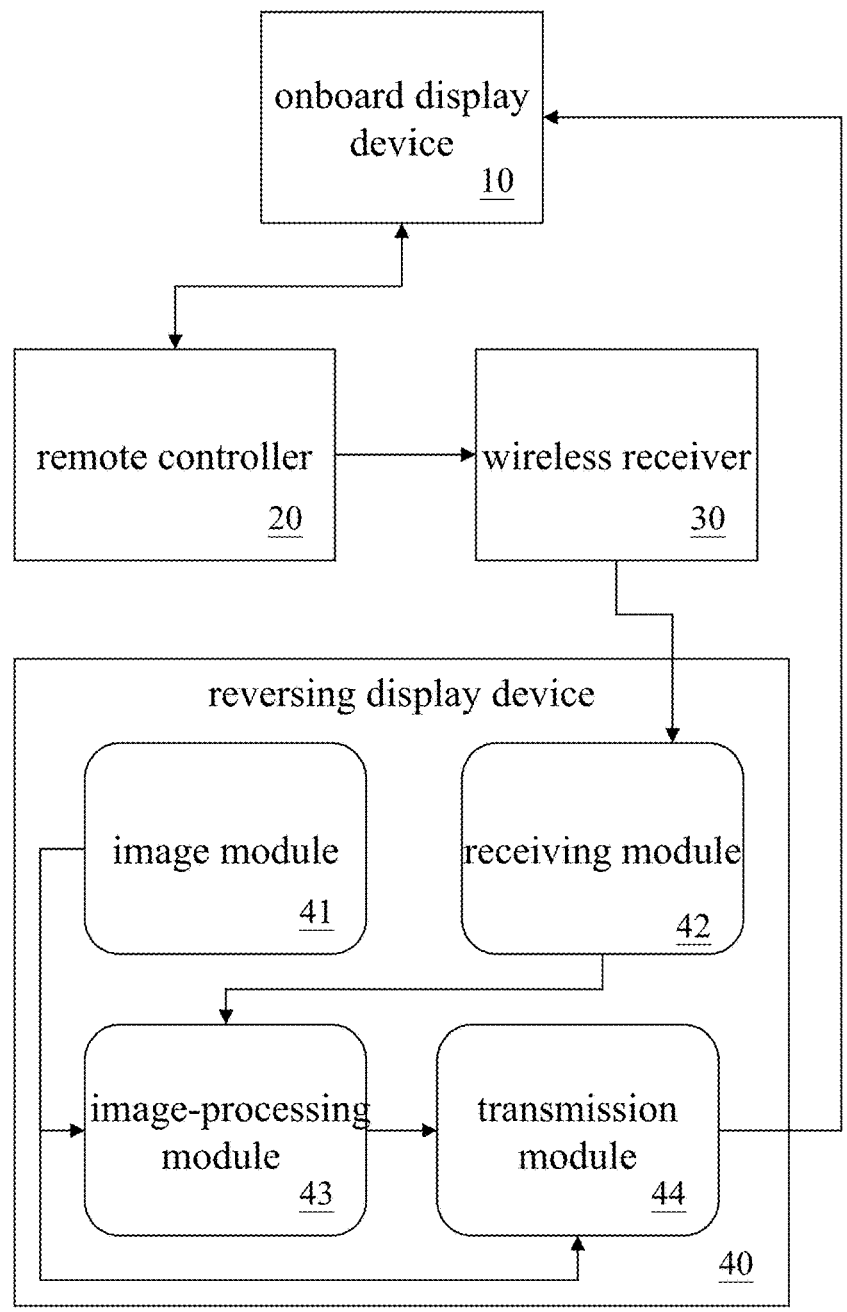
【FIG. 1】

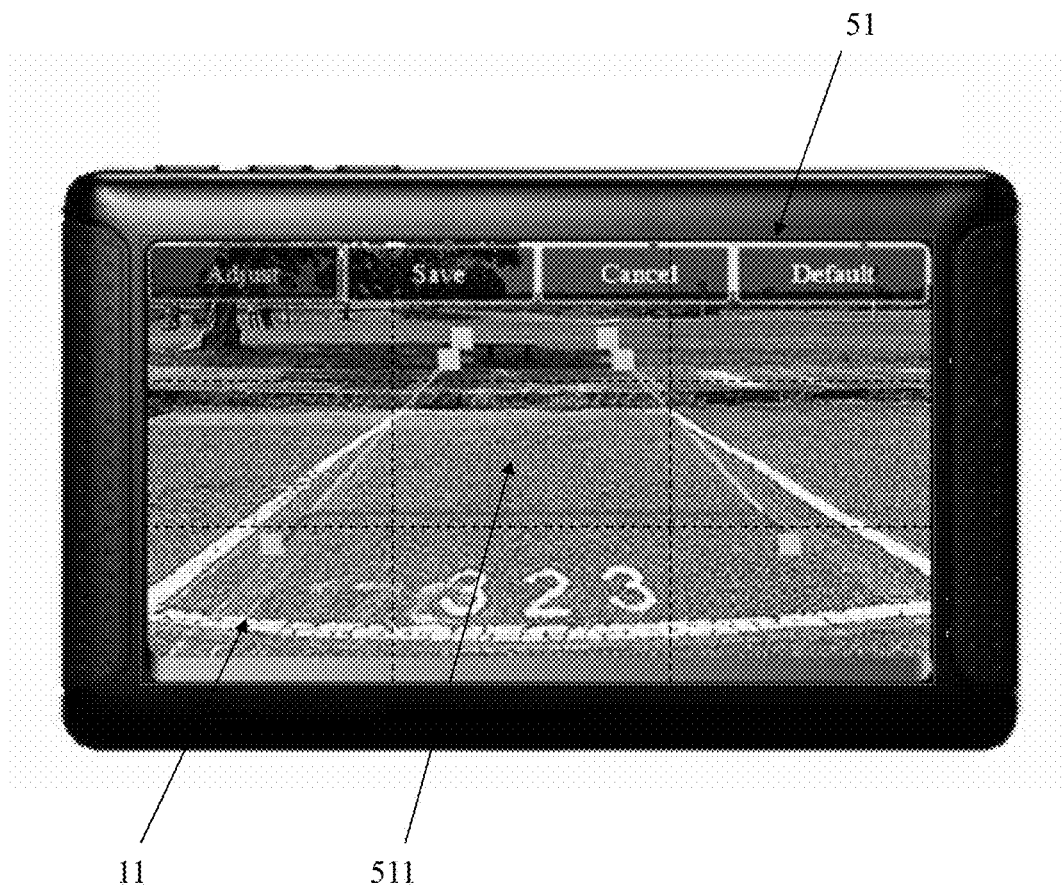
[FIG. 2A]

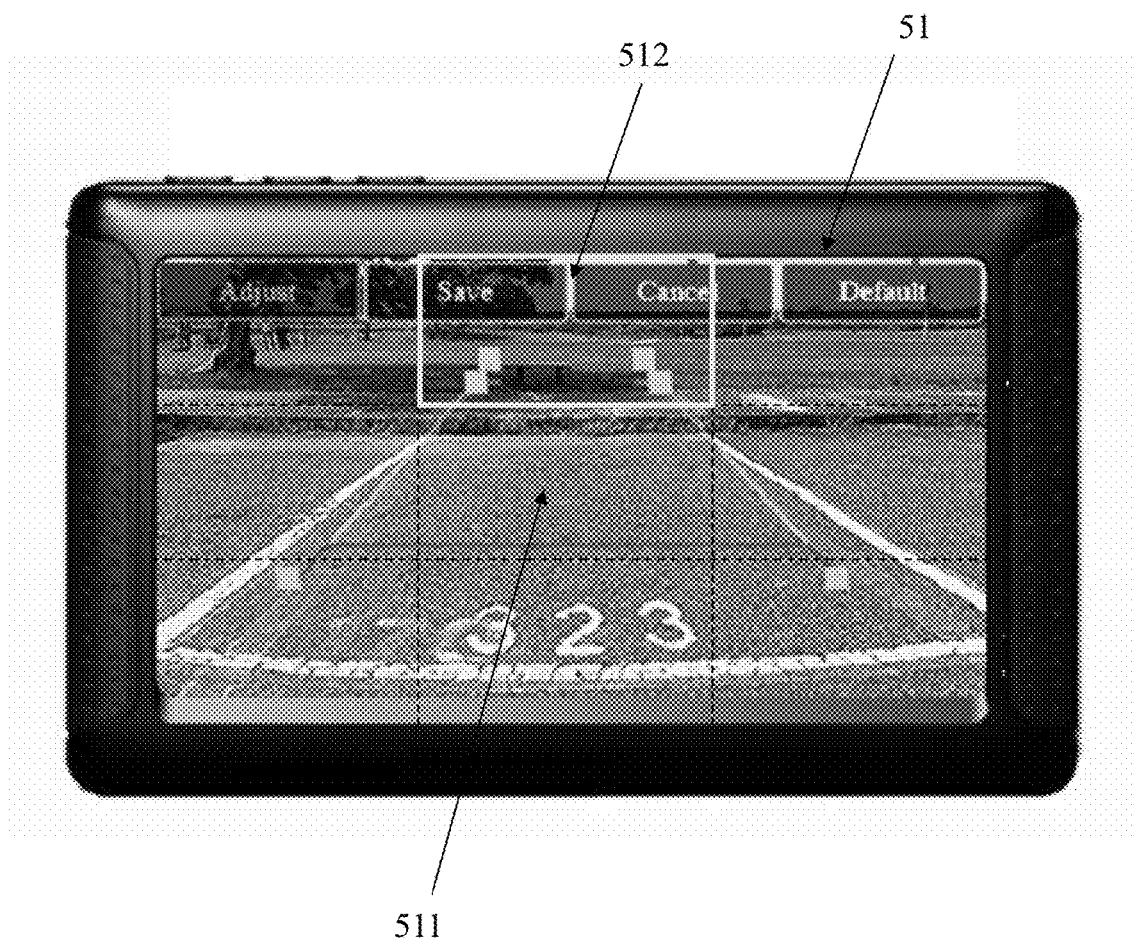
【FIG. 2B】

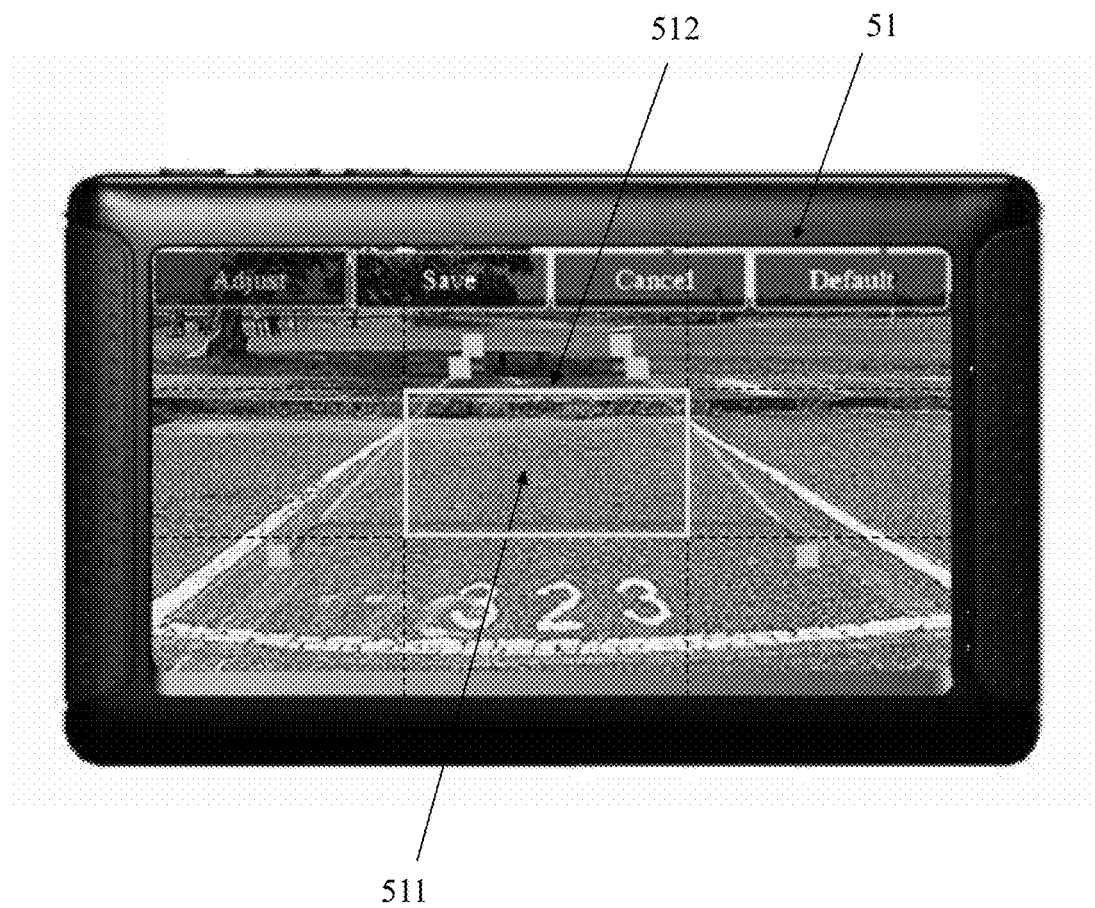
[FIG. 2C]

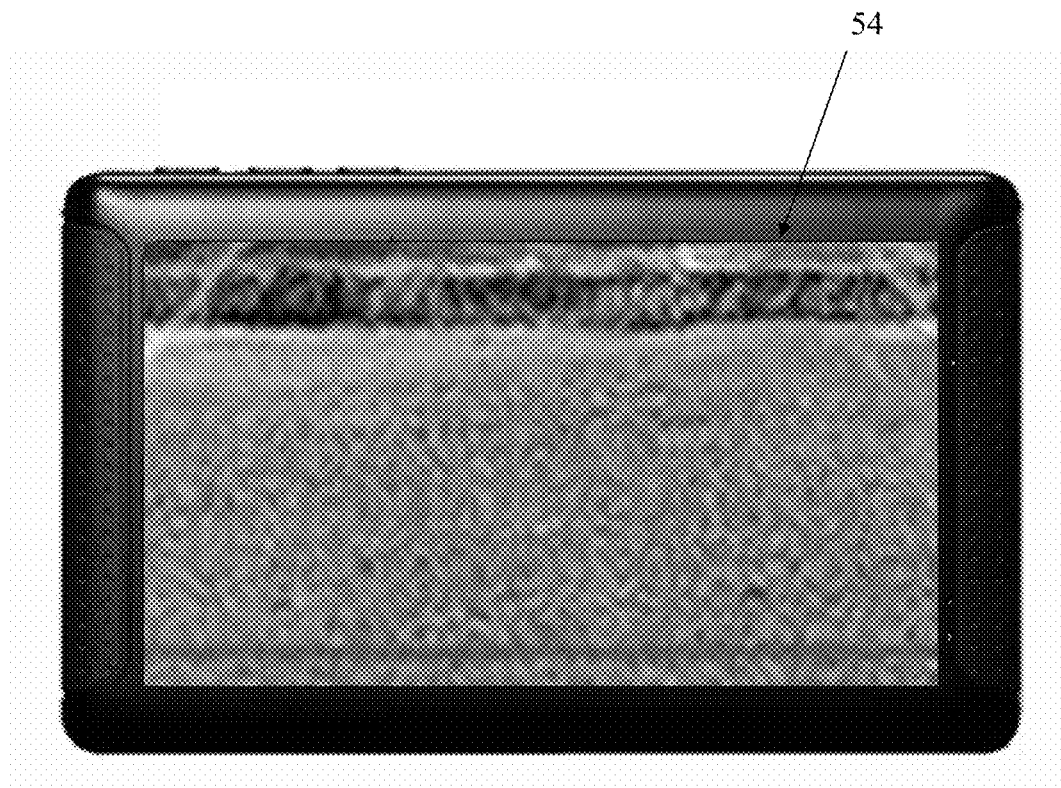
【FIG. 2D】

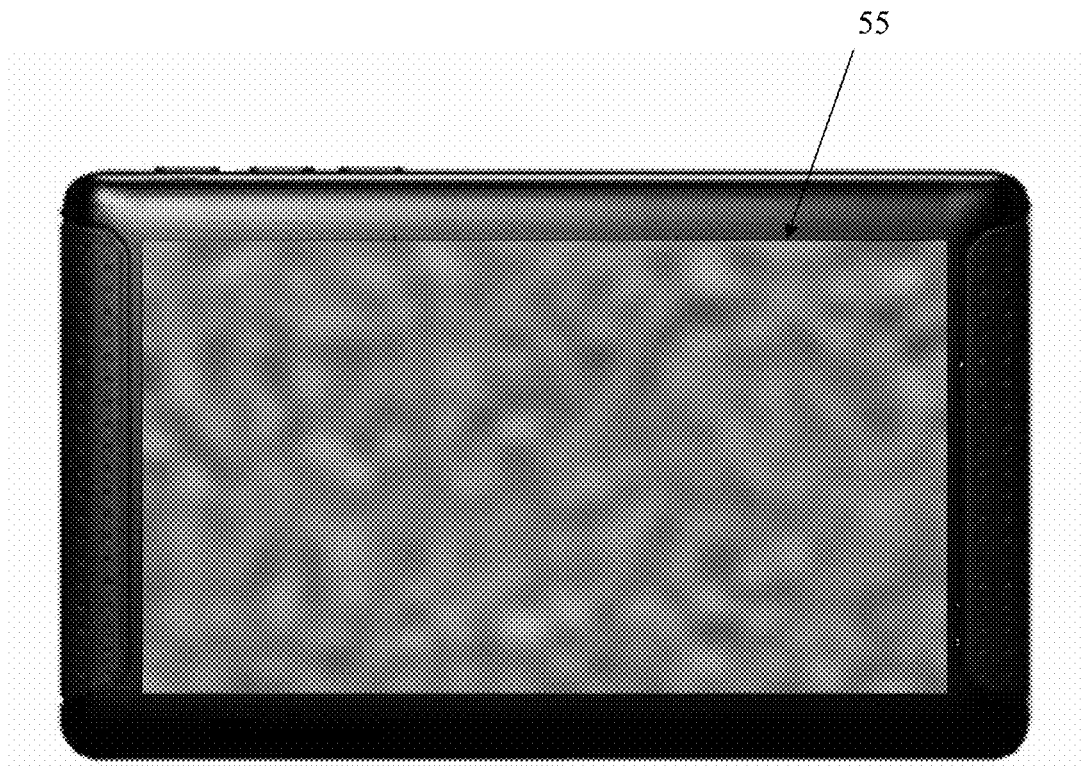
[FIG. 2E]

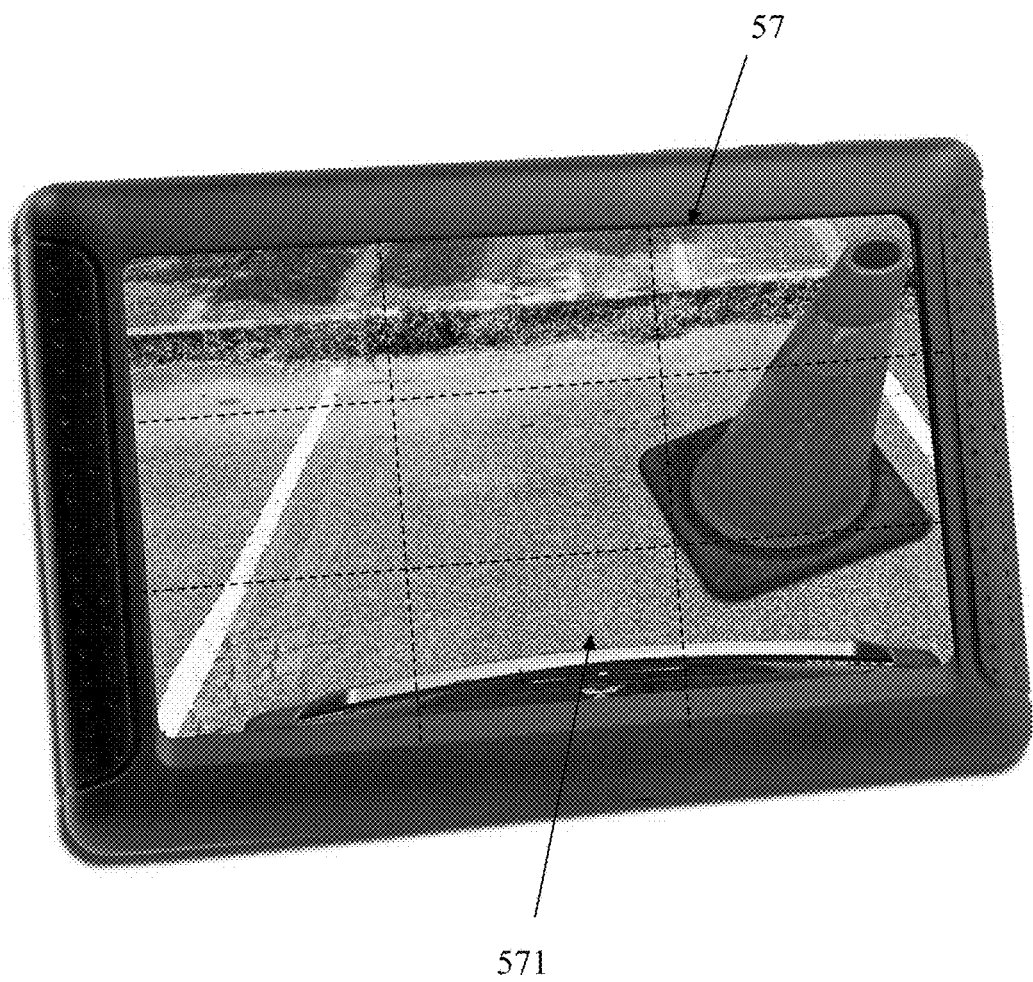
[FIG. 2F]

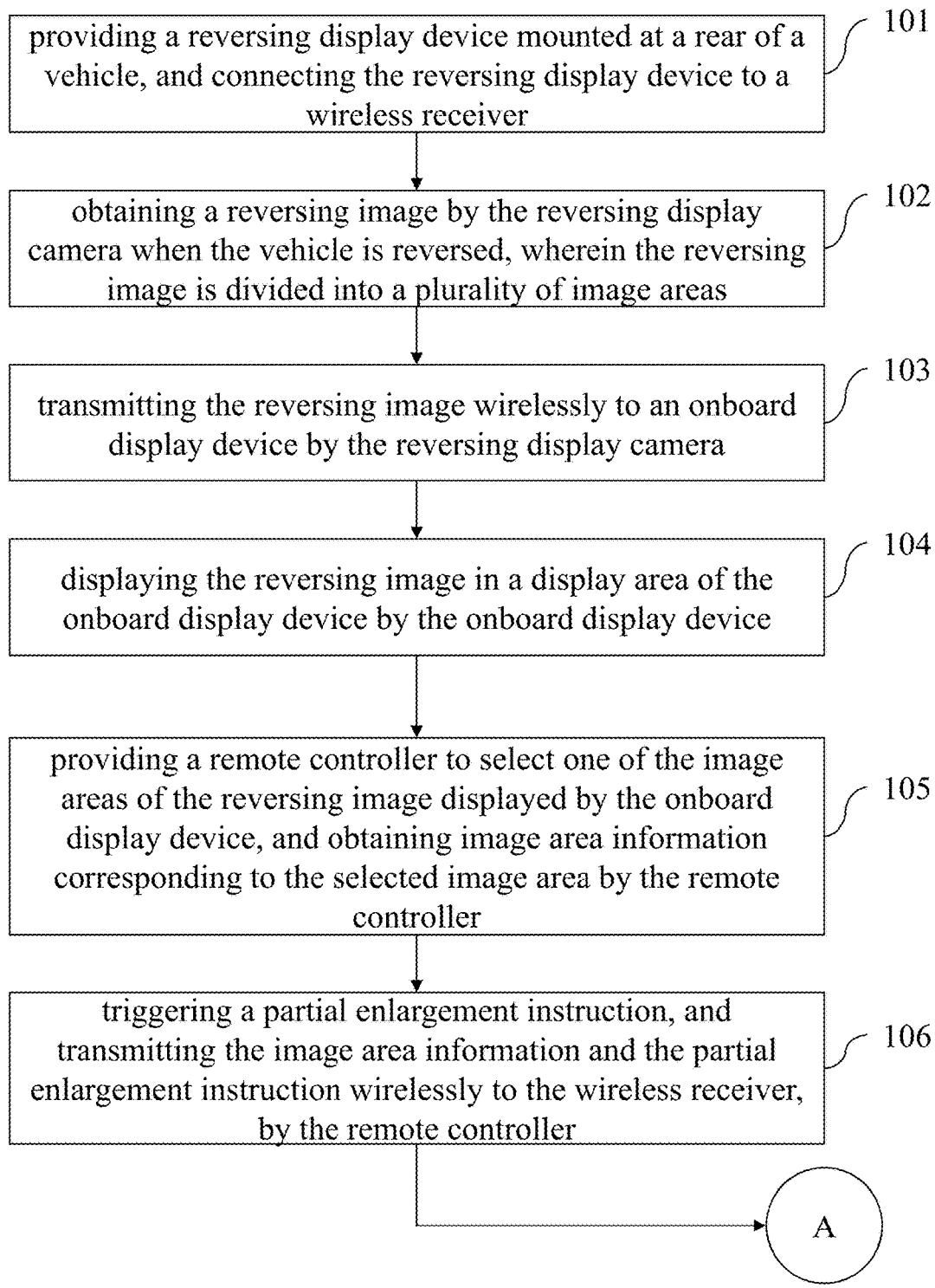
[FIG. 3A]

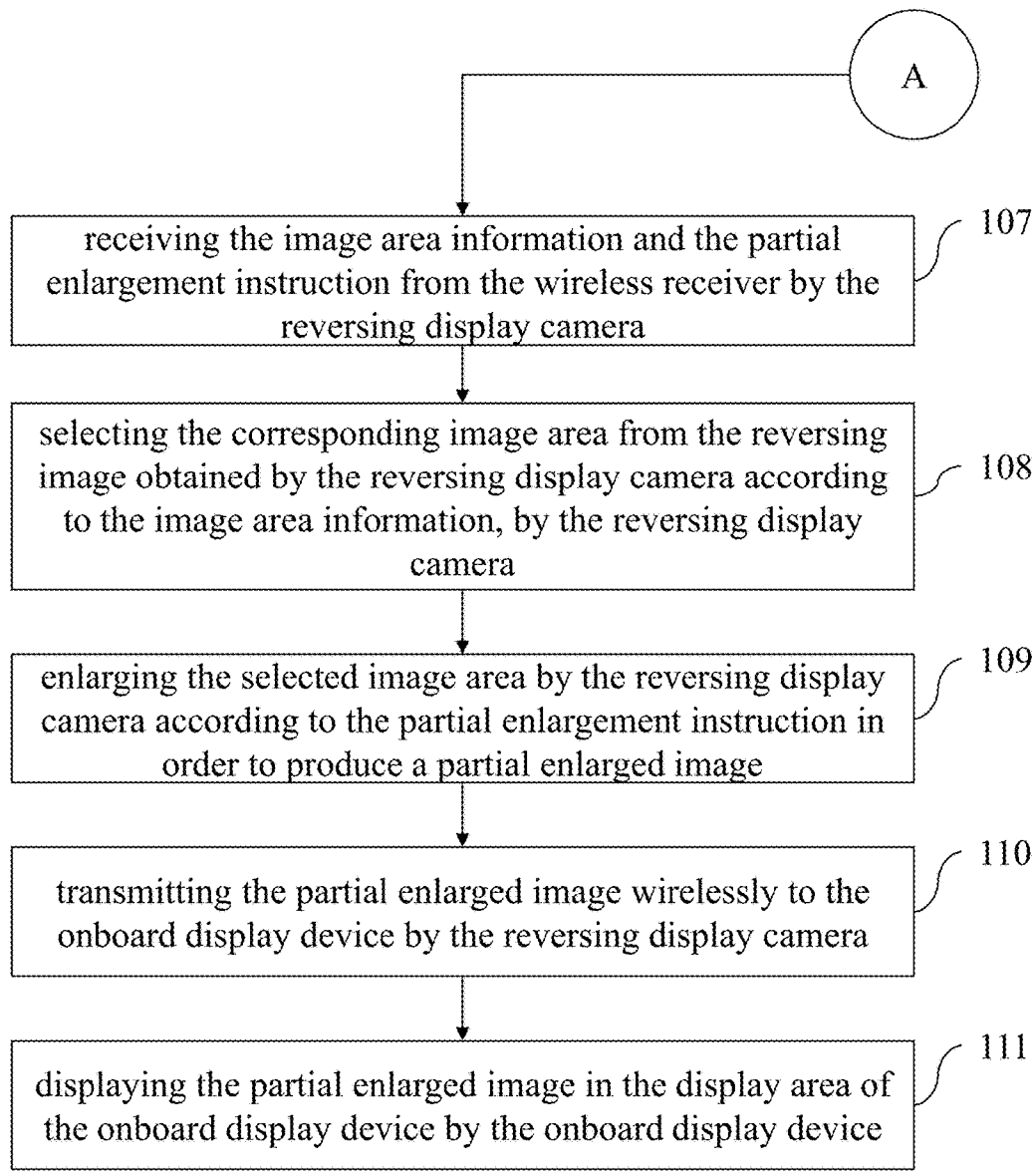
[FIG. 3B]

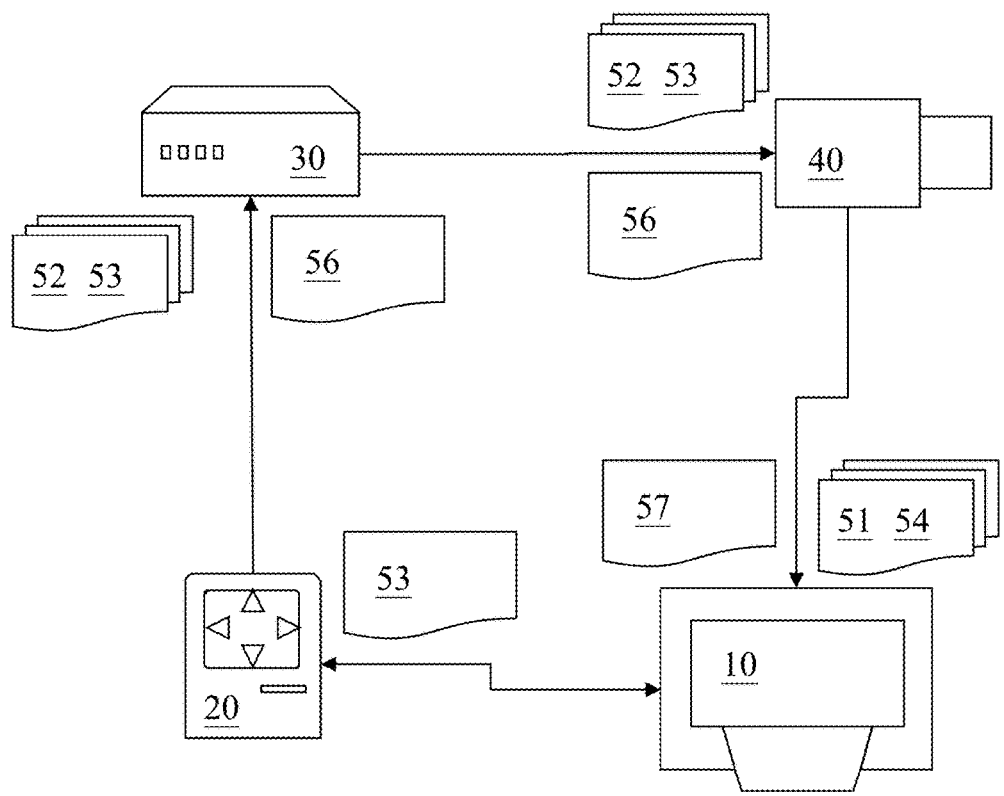
【FIG. 4】

REVERSING DISPLAY SYSTEM WITH WIRELESS SWITCHING MULTI-VIEW IMAGES AND METHOD THEREOF

BACKGROUND

1. Technical Field

The present invention relates to a reversing display system and a method thereof. More particularly, the invention relates to a reversing display system with wireless switching multi-view images for processing reversing images in order to enlarge the images partially and display the resulting partial enlarged images and a method thereof.

2. Description of Related Arts

The existing reversing display systems generally use a single image module to take a reversing image from a rear of a vehicle while the vehicle is reversing, or backing up. The image obtained shows the view behind the vehicle and thereby helps the driver reverse the vehicle into, for example, a roadside parking space or garage.

The existing reversing display systems, however, only display reversing images. While some reversing display systems allow their image modules to be rotated, a driver can only rotate the image module of such a system but cannot manipulate the reversing images taken. The driver may also find it inconvenient to rotate the image module while driving because the image module must be rotated by operating the user interface integrated into the reversing display system.

Another drawback of the existing reversing display systems is that they do not allow a driver to partially enlarge the reversing images displayed.

To sum up, what is needed is to develop a reversing display system to solve the problems that a driver cannot manipulate the reversing images in display, and that the existing reversing display systems lack an image-processing function for enlarging the reversing images partially.

SUMMARY

In order to solve above-mentioned problem, the present disclosure is to provide a reversing display system with wireless switching multi-view images, and method thereof.

According to an embodiment, the present disclosure provides a reversing display system with wireless switching multi-view images, comprising: an onboard display device, a remote controller, a wireless receiver, and a reversing display camera, wherein the reversing display camera comprises an image module, a receiving module, an image-processing module and a transmission module. The onboard display device is configured for receiving a reversing image or a partial enlarged image and displaying the reversing image or the partial enlarged image in a display area of the onboard display device, wherein the reversing image is divided into a plurality of image areas. The remote controller is configured for remotely selecting one of the image areas of the controller image displayed by the onboard display device, obtaining image area information corresponding to the selected image area, triggering a partial enlargement instruction, and transmitting the image area information and the partial enlargement instruction wirelessly. The wireless receiver is configured for receiving the image area information and the partial enlargement instruction from the remote controller. The reversing display camera is mounted at a rear of a vehicle and is connected to the wireless receiver. The image module is configured for obtaining the reversing image when the vehicle is reversed; the receiving module is configured for receiving the image area information and the partial enlargement instruction from the wireless receiver; the an image-processing module is configured for selecting the corresponding image area from the reversing image obtained by the image module according to the image area information, and enlarging the selected image area according to the partial enlargement instruction to produce the partial enlarged image; and the transmission module is configured for transmitting the reversing image or the partial enlarged image wirelessly to the onboard display device.

According to an embodiment, the present disclosure provides a reversing display method with wireless switching multi-view images, comprising the steps of: providing a reversing display camera mounted at a rear of a vehicle, and connecting the reversing display camera to a wireless receiver; obtaining a reversing image by the reversing display camera when the vehicle is reversed, wherein the reversing image is divided into a plurality of image areas; transmitting the reversing image wirelessly to an onboard display device by the reversing display camera; displaying the reversing image in a display area of the onboard display device by the onboard display device; providing a remote controller to select one of the image areas of the reversing image displayed by the onboard display device, and obtaining image area information corresponding to the selected image area by the remote controller; triggering a partial enlargement instruction, and transmitting the image area information and the partial enlargement instruction wirelessly to the wireless receiver, by the remote controller; receiving the image area information and the partial enlargement instruction from the wireless receiver by the reversing display camera; selecting the corresponding image area from the reversing image obtained by the reversing display camera according to the image area information, by the reversing display camera; enlarging the selected image area by the reversing display camera according to the partial enlargement instruction in order to produce a partial enlarged image; transmitting the partial enlarged image wirelessly to the onboard display device by the reversing display camera; and displaying the partial enlarged image in the display area of the onboard display device by the onboard display device.

According to above content, the difference between conventional technology and the technology of the present disclosure is that a driver can select an image area of a reversing image through the remote controller, and that the reversing display camera can obtain the corresponding image area information and a partial enlargement instruction from the remote controller through the wireless receiver connected to the remote controller and then enlarge the selected image area according to the partial enlargement instruction to produce a partial enlarged image, which is transmitted to the onboard display device for display.

By above technical means, the present invention can produce the intended technical effects of manipulating the reversing images in a remote control manner and displaying partial enlarged images on an onboard display device.

BRIEF DESCRIPTION OF THE DRAWINGS

FIG. 1 is a block diagram of a reversing display system with wireless switching multi-view images, in accordance with the present disclosure.

FIG. 2A shows the onboard display device of the system in FIG. 1 displaying a reversing image.

FIG. 2B and FIG. 2C show an image area selection process performed on the onboard display device in FIG. 2A.

FIG. 2D shows the onboard display device in FIG. 2C displaying a partial enlarged image.

FIG. 2E shows the onboard display device in FIG. 2D displaying a further enlarged image obtained by zooming in on the partial enlarged image in FIG. 2D through touch control.

FIG. 2F shows the onboard display device in FIG. 2A displaying a reversing image taken from a second viewing angle.

FIG. 3A and FIG. 3B show the flowchart of a reversing display method with wireless switching multi-view images, in accordance with the present disclosure.

FIG. 4 shows the system structure of the reversing display system with wireless switching multi-view images.

DETAILED DESCRIPTION

A detailed description of how the present invention can be implemented is given below with reference to an embodiment of the invention and the accompanying drawings in order to shed light on the technical means by which the invention solves the aforementioned technical problems and achieves the intended technical effects, and on how to carry out the invention.

The following embodiment is provided to demonstrate the operation of the system and method disclosed herein. Please refer to FIG. 1, FIGS. 3A-3B and FIG. 4, wherein FIG. 1 is a block diagram of a reversing display system with wireless switching multi-view images, in accordance with the present disclosure; FIG. 3A and FIG. 3B show the flowchart of a reversing display method with wireless switching multi-view images, in accordance with the present disclosure; and FIG. 4 shows the system structure of the reversing display system with wireless switching multi-view images.

The reversing display system with wireless switching multi-view images includes an onboard display device 10, a remote controller 20, a wireless receiver 30, and a reversing display camera 40. The reversing display camera 40 includes an image module 41, a receiving module 42, an image-processing module 43, and a transmission module 44.

In step 101, the reversing display camera 40 is mounted at the rear of a vehicle and is configured to connect with the wireless receiver 30 via wired or wireless transmission. Here, wired transmission may be carried out through a transmission line, and wireless transmission, through Wi-Fi, Bluetooth, or ZigBee. The aforesaid transmission methods are provided by way of example only and therefore are not restrictive of the scope of the invention.

The remote controller 20 is configured to connect with the wireless receiver 30 via wireless transmission, which may be carried out through Wi-Fi, Bluetooth, or ZigBee. The aforesaid transmission methods are provided by way of example only and therefore are not restrictive of the scope of the invention.

In step 102, as soon as the vehicle is reversed, the image module 41 of the reversing display camera 40 is activated and keeps taking a reversing image 51. The reversing image 51 is divided into a plurality of image areas 511. Each image area 511 has an area code and the same aspect ratio as the display area 11 of the onboard display device 10. For example, the display area 11 of the onboard display device 10 has a resolution of 800×600 (i.e., the aspect ratio of the display area 11 of the onboard display device 10 is 4:3), each image area 511 of the reversing image 51 may have a resolution of 400×300, 200×150, or the like (i.e., the aspect ratio of each image area 511 of the reversing image 51 is also 4:3).

In step 103, the transmission module 44 of the reversing display camera 40 receives the reversing image 51 from the image module 41 of the reversing display camera 40 and transmits the reversing image 51 to the onboard display device 10 (which is embedded in the vehicle) in a wired or wireless manner. Here, wired transmission may be carried out through a transmission line, and wireless transmission, through Wi-Fi, Bluetooth, or ZigBee. The aforesaid transmission methods are provided by way of example only and therefore are not restrictive of the scope of the invention.

In step 104, upon receiving the reversing image 51 from the transmission module 44 of the reversing display camera 40, the onboard display device 10 displays the reversing image 51 in the display area 11 of the onboard display device 10, as shown in FIG. 2A, which depicts the onboard display device 10 of the reversing display system with wireless switching multi-view images displaying the reversing image 51.

Reference is now made to FIG. 2B and FIG. 2C showing an image area selection process performed on the onboard display device 10 of the reversing display system with wireless switching multi-view images.

A driver can operate the Down button on the remote controller 20 to make the selection frame 512 be moved downward from the highlighted image area 511 in FIG. 2B to the highlighted image area 511 in FIG. 2C in a remote control manner. The driver can then operate the Confirm button on the remote controller 20 to trigger a partial enlargement instruction 52 in a remote control manner. In step 105, the remote controller 20, through which one of the image areas 511 of the reversing image 51 displayed by the onboard display device 10 has been selected remotely, obtains the image area information 53 corresponding to the selected image area 511. Here, the image area information 53 corresponding to the selected image area 511 is the area code of the selected image area 511.

It is noted that the Down, Confirm, and other (e.g., Up, Left, and Right) buttons by which to operate the remote controller 20 are provided by way of example only and therefore are not restrictive of the scope of the invention.

In step 106, the remote controller 20 transmits the image area information 53 and the partial enlargement instruction 52 wirelessly to the wireless receiver 30. In step 107, the receiver module 42 of the reversing display camera 40 receives the image area information 53 and the partial enlargement instruction 52 from the wireless receiver 30.

In step 108, once the receiving module 42 of the reversing display camera 40 receives the partial enlargement instruction 52 from the wireless receiver 30, the image-processing module 43 of the reversing display camera 40 selects the corresponding image area 511 from the reversing image 51 obtained by the image module 41 of the reversing display camera 40 according to the image area information 53. In step 109, the image-processing module 43 of the reversing display camera 40 calculates an enlargement ratio according to the resolutions of the selected image area 511 and the resolution of the display area 11, and enlarges the selected image area 511 according to the enlargement ratio to produce a partial enlarged image 54.

In step 110, the partial enlarged image 54 after performed on image processing by the image-processing module 43 of the reversing display camera 40 is then transmitted to the onboard display device 10 by the transmission module 44 of the reversing display camera 40. In step 111, the onboard display device 10 receives the partial enlarged image 54 from the image-processing module 43 of the reversing display camera 40 and display the partial enlarged image 54 in the display area 11 of the onboard display device 10, as shown in FIG. 2D, which depicts the onboard display device 10 of the reversing display system with wireless switching multi-view images displaying the partial enlarged image 54.

The driver can further use the touch control function of the onboard display device 10 to enlarge or reduce the partial enlarged image 54 displayed in the display area 11 of the onboard display device 10. For example, the driver can zoom in on the partial enlarged image 54 in FIG. 2D through touch control to produce the further enlarged image 55 in FIG. 2E, which depicts the onboard display device 10 of the reversing display system with wireless switching multi-view images displaying the further enlarged image 55 obtained by zooming in on the partial enlarged image 54 through touch control. Conversely, the driver can restore the partial enlarged image 54 from the further enlarged image 55 by zooming out on the further enlarged image 55 through touch control.

The driver can also operate the Switch button on the remote controller 20 to trigger an image-switching instruction 56. The remote controller 20 transmits the image-switching instruction 56 wirelessly to the wireless receiver 30, and the receiving module 42 of the reversing display camera 40 receives the image-switching instruction 56 from the wireless receiver 30.

Once the receiving module 42 of the reversing display camera 40 receives the image-switching instruction 56 from the wireless receiver 30, the image-processing module 43 of the reversing display camera 40 performs fisheye calibration, image cutting, white balance, and image exposure on the reversing image 51 to convert the reversing image 51 into a reversing image 57 taken from a second viewing angle (hereinafter referred to as the second-viewing-angle reversing image 57). The transmission module 44 of the reversing display camera 40 transmits the second-viewing-angle reversing image 57 to the onboard display device 10 via wired or wireless transmission. The onboard display device 10 receives the second-viewing-angle reversing image 57 from the transmission module 44 of the reversing display camera 40 and then display the second-viewing-angle reversing image 57 in the display area 11 of the onboard display device 10, as shown in FIG. 2F, which depicts the onboard display device 10 of the reversing display system with wireless switching multi-view images displaying the second-viewing-angle reversing image 57.

In addition, the second-viewing-angle reversing image 57 is also divided into a plurality of image areas 571 so as to be partially enlarged in the same way as the reversing image 51. Partial enlargement of the second-viewing-angle reversing image 57 can be understood by reference to the foregoing description of partial enlargement of the reversing image 51 and therefore will not be further dealt with.

According to the above, the difference between conventional technology and the technology of the present disclosure is that a driver can select an image area of a reversing image through the remote controller, and that the reversing display camera can obtain the corresponding image area information and a partial enlargement instruction from the remote controller through the wireless receiver connected to the remote controller and then enlarge the selected image area according to the partial enlargement instruction to produce a partial enlarged image, which is transmitted to the onboard display device for display.

The technical means described above can overcome the drawbacks of the prior art, namely failure to allow a driver to manipulate the reversing images displayed by a reversing display system and failure to enlarge the reversing images partially. The present invention, therefore, can produce the intended technical effects of manipulating the reversing images in a remote control manner and displaying partial enlarged images on an onboard display device.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A reversing display system with wireless switching multi-view images, comprising:
    an onboard display device for receiving a reversing image or a partial enlarged image and displaying the reversing image or the partial enlarged image in a display area of the onboard display device, wherein the reversing image is divided into a plurality of image areas;
    a remote controller for remotely selecting one of the image areas of the controller image displayed by the onboard display device, obtaining image area information corresponding to the selected image area, triggering a partial enlargement instruction, and transmitting the image area information and the partial enlargement instruction wirelessly;
    a wireless receiver for receiving the image area information and the partial enlargement instruction from the remote controller; and
    a reversing display camera mounted at a rear of a vehicle and connected to the wireless receiver, wherein the reversing display camera comprises:
        an image module for obtaining the reversing image when the vehicle is reversed;
        a receiving module for receiving the image area information and the partial enlargement instruction from the wireless receiver;
        an image-processing module for selecting the corresponding image area from the reversing image obtained by the image module according to the image area information, and enlarging the selected image area according to the partial enlargement instruction to produce the partial enlarged image; and
        a transmission module for transmitting the reversing image or the partial enlarged image wirelessly to the onboard display device.

2. The reversing display system with wireless switching multi-view images of claim 1, wherein each image area has a same aspect ratio as the display area.

3. The reversing display system with wireless switching multi-view images of claim 1, wherein each image area has an area code, and the image area information is one of the area codes.

4. The reversing display system with wireless switching multi-view images of claim 1, wherein the remote controller is also configured for receiving an image-switching instruction and for transmitting the image-switching instruction wirelessly to the wireless receiver, the receiving module receives the image-switching instruction from the wireless receiver, the image-processing module performs fisheye calibration, image cutting, white balance, and image exposure on the reversing image to convert the reversing image into a second-viewing-angle reversing image, the transmission module transmits the second-viewing-angle reversing image wirelessly to the onboard display device, and the onboard display device displays the second-viewing-angle reversing image in the display area.

5. The reversing display system with wireless switching multi-view images of claim 1, wherein the reversing display camera is connected to the wireless receiver through wired or wireless transmission.

6. A reversing display method with wireless switching multi-view images, comprising the steps of:
   providing a reversing display camera mounted at a rear of a vehicle, and connecting the reversing display camera to a wireless receiver;
   obtaining a reversing image by the reversing display camera when the vehicle is reversed, wherein the reversing image is divided into a plurality of image areas;
   transmitting the reversing image wirelessly to an onboard display device by the reversing display camera;
   displaying the reversing image in a display area of the onboard display device by the onboard display device;
   providing a remote controller to select one of the image areas of the reversing image displayed by the onboard display device, and obtaining image area information corresponding to the selected image area by the remote controller;
   triggering a partial enlargement instruction, and transmitting the image area information and the partial enlargement instruction wirelessly to the wireless receiver, by the remote controller;
   receiving the image area information and the partial enlargement instruction from the wireless receiver by the reversing display camera;
   selecting the corresponding image area from the reversing image obtained by the reversing display camera according to the image area information, by the reversing display camera;
   enlarging the selected image area by the reversing display camera according to the partial enlargement instruction in order to produce a partial enlarged image;
   transmitting the partial enlarged image wirelessly to the onboard display device by the reversing display camera; and
   displaying the partial enlarged image in the display area of the onboard display device by the onboard display device.

7. The reversing display method with wireless switching multi-view images of claim 6, wherein each image area has a same aspect ratio as the display area.

8. The reversing display method with wireless switching multi-view images of claim 6, wherein in the step of obtaining the reversing image by the reversing display camera when the vehicle is reversed, with the reversing image divided into the image areas, each image area has an area code; and in the step of providing the remote controller to select one of the image areas of the reversing image displayed by the onboard display device and obtaining the image area information corresponding to the selected image area by the remote controller, the image area information corresponding to the selected image area is the area code of the selected image area.

9. The reversing display method with wireless switching multi-view images of claim 6, further comprising the steps of:
   receiving an image-switching instruction, by the remote controller;
   transmitting the image-switching instruction wirelessly to the wireless receiver by the remote controller;
   receiving the image-switching instruction from the wireless receiver by the reversing display camera;
   performing fisheye calibration, image cutting, white balance, and image exposure on the reversing image by the reversing display camera upon receiving the image-switching instruction, in order to convert the reversing image into a second-viewing-angle reversing image;
   transmitting the second-viewing-angle reversing image wirelessly to the onboard display device by the reversing display camera; and
   displaying the second-viewing-angle reversing image in the display area of the onboard display device by the onboard display device.

10. The reversing display method with wireless switching multi-view images of claim 6, wherein in the step of connecting the reversing display camera to the wireless receiver, the reversing display camera is connected to the wireless receiver through wired or wireless transmission.

* * * * *